(12) United States Patent
Kishimoto et al.

(10) Patent No.: US 7,530,870 B2
(45) Date of Patent: May 12, 2009

(54) DRIVE SHAFT SEALING DEVICE FOR SMALL WATERCRAFT

(75) Inventors: Hiroyuki Kishimoto, Shizuoka-ken (JP); Tetsuya Mashiko, Shizuoka-ken (JP); Hirohiko Kakuyama, Tokushima (JP); Syuuji Fujita, Tokushima (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 11/864,493

(22) Filed: Sep. 28, 2007

(65) Prior Publication Data
US 2009/0036006 A1 Feb. 5, 2009

(30) Foreign Application Priority Data
Aug. 1, 2007 (JP) ............................. 2007-200400

(51) Int. Cl.
| | |
|---|---|
| B63H 23/36 | (2006.01) |
| B63H 23/34 | (2006.01) |
| F16J 15/00 | (2006.01) |
| F16J 15/40 | (2006.01) |
| F16J 15/32 | (2006.01) |
| B63H 1/00 | (2006.01) |
| F16J 9/00 | (2006.01) |

(52) U.S. Cl. .................. 440/112; 440/83; 277/349; 277/423; 277/424; 277/562; 277/563; 277/345; 277/572; 416/174

(58) Field of Classification Search ............ 440/83, 440/112; 277/349, 423, 424, 562, 563, 572; 416/174
See application file for complete search history.

(56) References Cited

U.S. PATENT DOCUMENTS

| | | | | |
|---|---|---|---|---|
| 3,894,741 A | * | 7/1975 | McHugh ...................... 277/318 |
| 4,890,941 A | * | 1/1990 | Calafell et al. .............. 277/347 |
| 5,219,434 A | * | 6/1993 | Von Bergen et al. ......... 277/351 |
| 5,558,456 A | * | 9/1996 | Nakase et al. ............. 403/359.1 |

FOREIGN PATENT DOCUMENTS

JP 08-177868 7/1996

* cited by examiner

Primary Examiner—Lars A Olson
Assistant Examiner—Daniel V Venne
(74) Attorney, Agent, or Firm—Knobbe, Martens, Olson & Bear, LLP

(57) ABSTRACT

A sealing member can include a radially-working lip which contacts a drive shaft in a radial direction to seal a gap between the drive shaft and the housing in the radial direction, an axially-working lip extending in an axial direction, and a contact member which contacts the axially-working lip to seal the gap between the drive shaft and the housing in the axial direction. The contact member can be fitted to the drive shaft to rotate with the drive shaft.

15 Claims, 7 Drawing Sheets

DRIVE SHAFT SEALING DEVICE FOR SMALL WATERCRAFT

PRIORITY INFORMATION

This application is based on and claims priority to Japanese Patent Application No. 2007-200400, filed Aug. 1, 2007, the entire contents of which is hereby expressly incorporated by reference.

BACKGROUND OF THE INVENTIONS

1. Field of the Inventions

The present inventions relate to propulsion systems for watercraft, and more particularly, to a seals drive shafts of watercraft.

2. Description of the Related Art

Some small watercraft include a drive train designed to transmit engine power to a propulsion unit through a drive shaft. The drive shaft can be supported by a housing and a bearing. In some arrangements, a sealing member is interposed between the drive shaft and the housing in order to prevent water from entering the bearing through a gap between the drive shaft and the housing.

Japanese Patent Document JP-A-Hei 8-177868 discloses an example of a conventional drive shaft sealing device for a small watercraft. This sealing device includes oil seals disposed on both sides of the bearing that supports an impeller shaft. Two of the oil seals are provided on one of the sides of the bearing, which faces water, in order to prevent the water from entering the bearing when lubricant oil is filled in a space between the oil seals and the bearing.

SUMMARY OF THE INVENTIONS

Oil seals like that disclosed in Japanese Patent Document JP-A-Hei 8-177868 are designed solely to seal a gap between the impeller shaft and the housing in the radial direction. However, a water pressure applied to the bearing also acts on the impeller shaft in the axial direction. An aspect of at least one of the embodiments disclosed herein includes the realization that, assuming that the water pressure in the axial direction increases with an increase in engine output, the conventional sealing device described above may not sufficiently prevent water from entering the bearing.

Thus, in accordance with an embodiment, a drive shaft sealing device can be provided for a small watercraft which can comprise a drive shaft configured to transmit engine power to a propulsion unit, a bearing rotatably supporting the drive shaft, a housing holding the bearing, and a sealing member interposed between the housing and the drive shaft and configured to prevent water from entering the bearing. The sealing member can comprise a radially sealing section which contacts the drive shaft in a radial direction to seal a gap between the drive shaft and the housing in the radial direction. An axially sealing section can extend in an axial direction, and a contact member can contact the axially sealing section to seal the gap between the drive shaft and the housing in the axial direction. The contact member can be connected to the drive shaft to rotate with the drive shaft.

In accordance with another embodiment, a watercraft can comprise a hull and a spinning shaft extending through an aperture in the hull. A shaft sealing assembly comprising a bearing rotatably supporting the spinning shaft, a housing supporting the bearing, and a sealing member interposed between the housing and the drive shaft and configured to prevent water from entering the bearing. The sealing member can comprise a generally radially extending sealing section which contacts the spinning shaft in a generally radial direction to seal a gap between the spinning shaft and the housing in the radial direction. A generally axially extending sealing section can extend in a generally axial direction. A contact member can contact the generally axially extending sealing section to seal the gap between the spinning shaft and the housing in the axial direction. The contact member can be connected to the spinning shaft to rotate with the spinning shaft.

In accordance with yet another embodiment, a shaft sealing assembly can be provided for supporting a spinning shaft. The shaft sealing assembly can comprise a bearing rotatably supporting the spinning shaft, a housing supporting the bearing, and a sealing member interposed between the housing and the drive shaft and configured to prevent water from entering the bearing. The sealing member can comprise a generally radially extending sealing section which contacts the spinning shaft in a generally radial direction to seal a gap between the spinning shaft and the housing in the radial direction. A generally axially extending sealing section can extend in a generally axial direction. A contact member can contact the generally axially extending sealing section to seal the gap between the spinning shaft and the housing in the axial direction. The contact member can be connected to the spinning shaft to rotate with the spinning shaft.

In accordance with a further embodiment, a bearing assembly can comprise a housing, a bearing supporting a shaft, the bearing being supported by the housing, a seal member disposed between the shaft and the housing and a fluid pumping device connected to the shaft so as to rotate therewith. The seal member can be disposed between the bearing and the fluid pumping device. The fluid pumping device can comprise at least one portion extending generally radially away from the shaft so as to generate a centrifugal pumping action to discharge fluid away from the bearing and seal member when the shaft spins.

In accordance with yet another embodiment, a seal member can be configured to provide a seal between a shaft and an annular body disposed around the shaft. The seal member can include a generally radially extending sealing section which contacts the spinning shaft in a generally radial direction to seal a gap between the spinning shaft and the annular body in the radial direction, and a generally axially extending sealing section extending in a generally axial direction.

BRIEF DESCRIPTION OF THE DRAWINGS

The above-mentioned and other features of the inventions disclosed herein are described below with reference to the drawings of the preferred embodiments. The illustrated embodiments are intended to illustrate, but not to limit the inventions. The drawings contain the following Figures.

DETAILED DESCRIPTION OF THE PREFERRED EMBODIMENT

Figure 1:
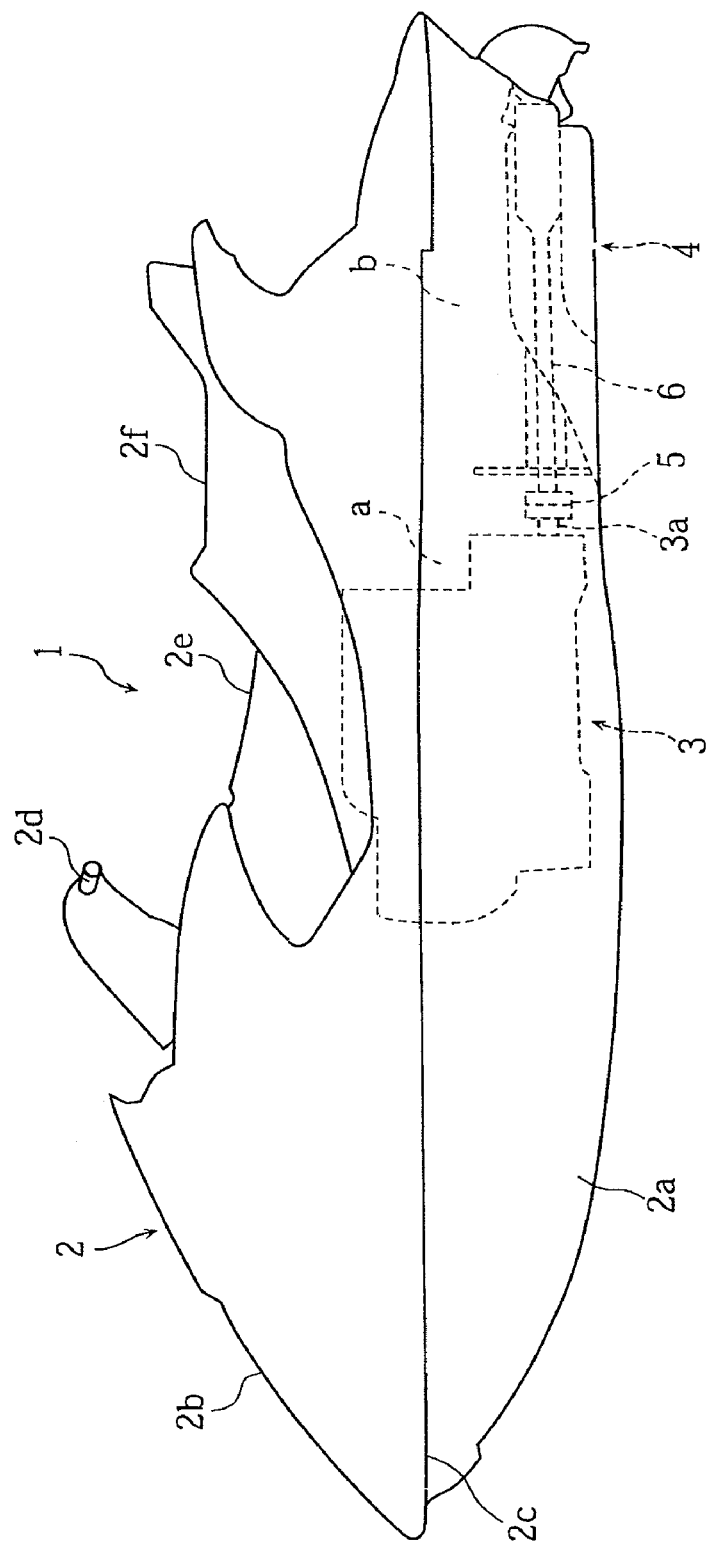
FIG. 1 is a side view of a small watercraft having a sealing device according to an embodiment.

Improved shaft sealing devices are disclosed herein. Although the present shaft sealing devices are illustrated and described in the context of a personal watercraft, certain aspects of the present inventions can be used with propulsion systems of other types of watercraft such as inboard engine powered watercraft having a screw as a propulsion unit or other types of vehicles and or systems having a spinning shaft.

In FIGS. 1 to 6, reference numeral 1 denotes a small watercraft. The small watercraft 1 can have a hull 2 that is nearly or substantially watertight, an engine 3 located within the hull 2, and a water jet pump (propulsion unit) 4 driven by the engine 3. However, other types of propulsion units can also be used.

The hull 2 can include a lower body 2a, an upper body 2b, and a gunnel 2c at which the lower body 2a and the upper body 2b can be joined together in a watertight manner. The hull 2 can also include steering handlebars 2d for changing a cruising direction to left or right, and a main seat 2e and a tandem seat 2f for occupants to sit. The main seat 2e and the handlebars 2d can define the operator's area of the watercraft 1.

Figure 2:
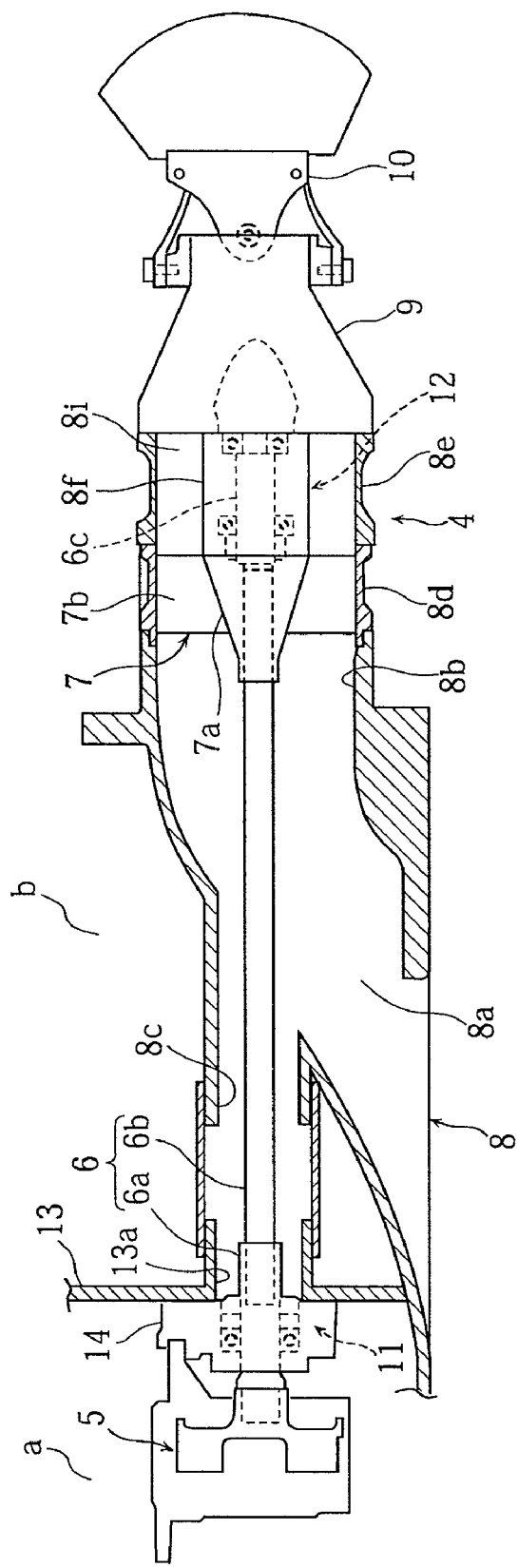
FIG. 2 is an enlarged partial sectional and side elevational view, of a drive shaft and a propulsion unit of the small watercraft.
Figure 3:
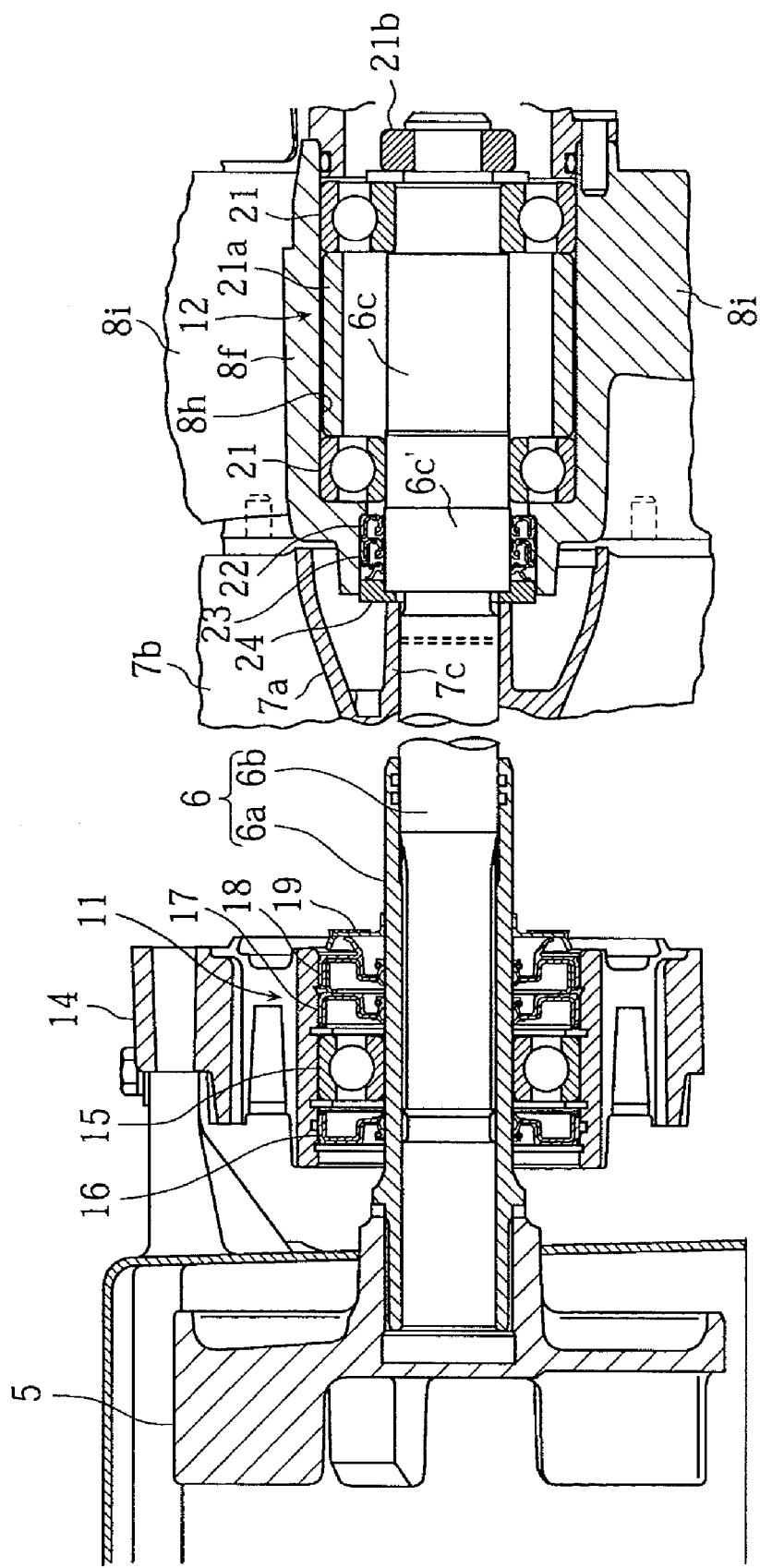
FIG. 3 is an enlarged sectional side view of the drive shaft and a propulsion unit of FIG. 2, illustrating a sealing device than can be used with the small watercraft.
Figure 4:
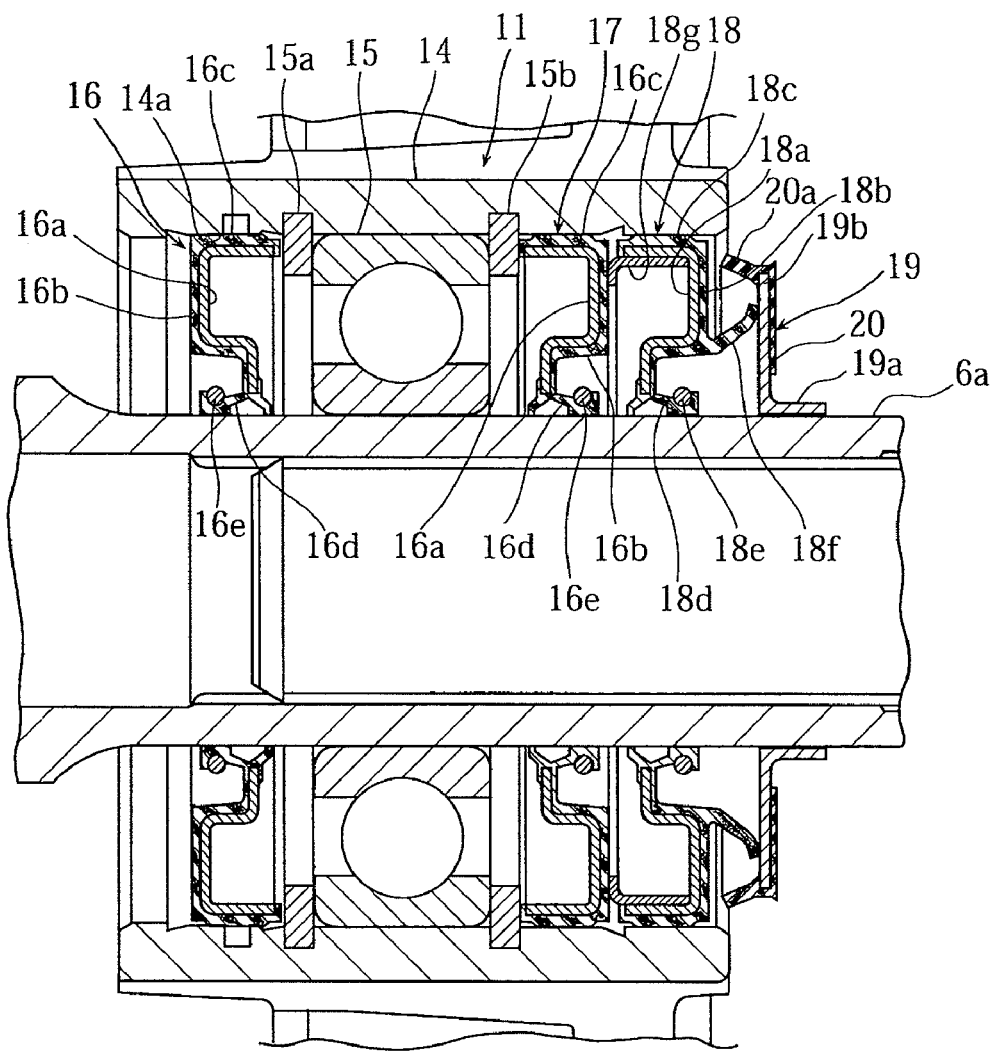
FIG. 4 is a further enlarged sectional side view, illustrating a front part of the sealing device.

With continued reference to FIG. 2, the engine 3 can be mounted in an engine compartment (a) within the hull 2 with its crankshaft oriented in the longitudinal direction of the hull 2. The engine 3 can have an output shaft 3a connected to a drive shaft 6 via a coupling 5.

The drive shaft 6 can be designed to transmit engine output to a water jet pump 4. The drive shaft 6 can have a sleeve 6a coupled to or screwed into the coupling 5, and a drive shaft body 6b inserted into the sleeve 6a such that the drive shaft body 6b can be movable in the axial direction and rotatable with the sleeve 6a. The drive shaft 6 can be formed from any element as long as it transmits engine power to the propulsion unit. In some embodiments, the drive shaft 6 can include a solid element as well as a hollow element (e.g. sleeve 6a). Additionally, the drive shaft 6 itself can be formed from one or a plurality of shaft bodies and or shaft sleeves connected together with splined connections, for example.

The sleeve 6a, in some embodiments, can be secured to the shaft body 6b in a watertight manner. For example, but without limitation, seals, watertight adhesives, or other watertight materials, can be disposed between the shaft body 6b and sleeve 6a. In some embodiments, the shaft body 6b can be connected to the sleeve 6a with a slip fit, and interference fit, and/or the use of a key way and mating key. However, other configurations can also be used.

The water jet pump 4 can be connected to a rear end of the drive shaft body 6b. The water jet pump 4 can include an impeller 7 driven by the drive shaft body 6b, a water passage 8 through which water drawn by rotations of the impeller 7 passes, a jet nozzle 9 for jetting the water pressurized by the impeller 7, and a steering nozzle 10 for changing a cruising direction by means of steering operation of the steering handlebars 2d.

The water passage 8 can have a water intake section 8a opened to a bottom of the hull for introducing water toward the rear in the obliquely upward direction, a cylindrical pressurizing section 8b extending rearward from the water intake section 8a in the approximately horizontal direction, an impeller housing section 8d connected to the pressurizing section 8b, and a bearing housing section 8e. The jet nozzle 9 can be connected to the bearing housing section 8e. However, other configurations can also be used.

The water passage 8 can be bifurcated in a position at about a border between the pressurizing section 8b and the water intake section 8a, defining a guide section 8c extending forwardly. The guide section 8c can be connected to an opening 13a of a partition 13 which can define a division between the engine compartment (a) and a pump room (b). The drive shaft 6 can extends from the coupling 5 through an inner space within the opening 13a, the guide section 8c, the pressurizing section 8b, and the impeller housing section 8d to the bearing housing section 8e. However, other configurations can also be used.

The impeller 7 can have a truncated conical blade boss 7a and a helical blade 7b fixed around the blade boss 7a. The blade boss 7a has an integrally formed axial boss portion 7c along its axial part. The axial boss portion 7c can be fixed to the drive shaft body 6b by means of a threaded connection, a key and keyway, threaded fasteners, or the like.

The sleeve 6a, located at a front end of the drive shaft 6, can be supported rotatably by a front bearing device 11. The support section 6c, located at the rear end of the drive shaft body 6b, can be supported rotatably by a rear bearing device 12. However, other configurations can also be used.

The front bearing device 11 can include a front housing 14 fixed to the partition 13 and a front bearing 15 placed between the front housing 14 and the sleeve 6a. Areas forward and rearward relative to the front bearing 15 can be sealed by sealing members. The sealing members can include a first oil seal 16 and a second oil seal 17, respectively located forward and rearward relative to the front bearing 15, a third oil seal 18 located rearward relative to the second oil seal 17, and a front contact member 19 located rearward relative to the third oil seal 18. Reference numerals 15a and 15b identify snap rings for restricting the location of the front bearing 15 in the longitudinal direction of the hull. The front housing 14 can be made of aluminum alloy. However, other configurations can also be used.

Although the first and second oil seals 16, 17 can have common structures, the first oil seal 16 and the second oil seal 17 can be oriented in opposite directions to face each other. Each of the first oil seal 16 and the second oil seal 17 can have a retainer ring 16a which can be formed by pressing a metal plate into an overall ring shape with a U-shape in section, and a sealing body 16b located to cover one of end surfaces of the retainer ring 16a and fixed thereto by baking or the like. However, other configurations can also be used.

The first oil seal 16 and the second oil seal 17 can be fixed to the front housing 14 by individually press-fitting an outer peripheral portion 16c of the sealing body 16b into a retainer hole 14a of the front housing 14. A radially-working lip 16d can be formed as a radially sealing section on an inner peripheral edge of the sealing body 16b. The radially-working lip 16d contacts the sleeve 6a in the radial direction. A spring ring 16e can be disposed in the radially-working lip 16d. The spring ring 16e urges the radially-working lip 16d in a direction such that the lip 16d can be compressed radially, thereby improving sealability between the radially-working lip 16d and the sleeve 6a in the radial direction.

The third oil seal 18 can have a retainer ring 18a and a sealing body 18b, which, respectively, can have shapes in common with the retainer rings 16a and the sealing bodies 16b of the first oil seal 16 and the second oil seal 17. A reinforcement retainer ring 18g can be press-fitted into an inner space of the retainer ring 18a. The third oil seal 18 can be fixed to the front housing 14 by press-fitting an outer peripheral portion 18c of the sealing body 18b into the retainer hole 14a. A radially-working lip 18d can be formed as a radially sealing section on an inner peripheral edge of the sealing body 18b. The radially-working lip 18d contacts the sleeve 6a in the radial direction. A spring ring 18e, which can be the same as the spring ring 16e, can be disposed in the radial lip 18d. However, other configurations can also be used.

In some embodiments, an axially-working lip 18f, which can serve as an axially sealing section, can be formed integrally with the sealing body 18b. The axially-working lip 18f can extend radially outward and obliquely toward the rear in sectional view. However, other configurations can also be used.

The front contact member 19 can be formed by pressing a metal plate (a stainless plate in some embodiments) into an overall ring shape with an L-shape in section having a generally horizontal side 19a and a generally vertical side 19b. The generally horizontal side 19a of the front contact member 19 can be press-fitted onto the sleeve 6a. A tip end of the axially-working lip 18f can contact one of the surfaces of the generally vertical side 19b, e.g., the surface facing the front bearing 15. However, other configurations can also be used.

A cover 20, which can be made of an insulating material such as rubber, can be fixed to the other surface of the vertical side 19b, e.g., the surface not facing the front bearing 15, by means of baking or the like. An anti galvanic corrosion lip 20a can be formed on an outer peripheral portion of the cover 20. The anti galvanic corrosion lip 20a can cover an outer peripheral edge of the front contact member 19, while extending radially outward and obliquely toward the front. A tip end of the anti galvanic corrosion lip 20a neighbors or contacts an axial end surface portion of the sealing body 18b of the third seal oil 18.

Figure 5:
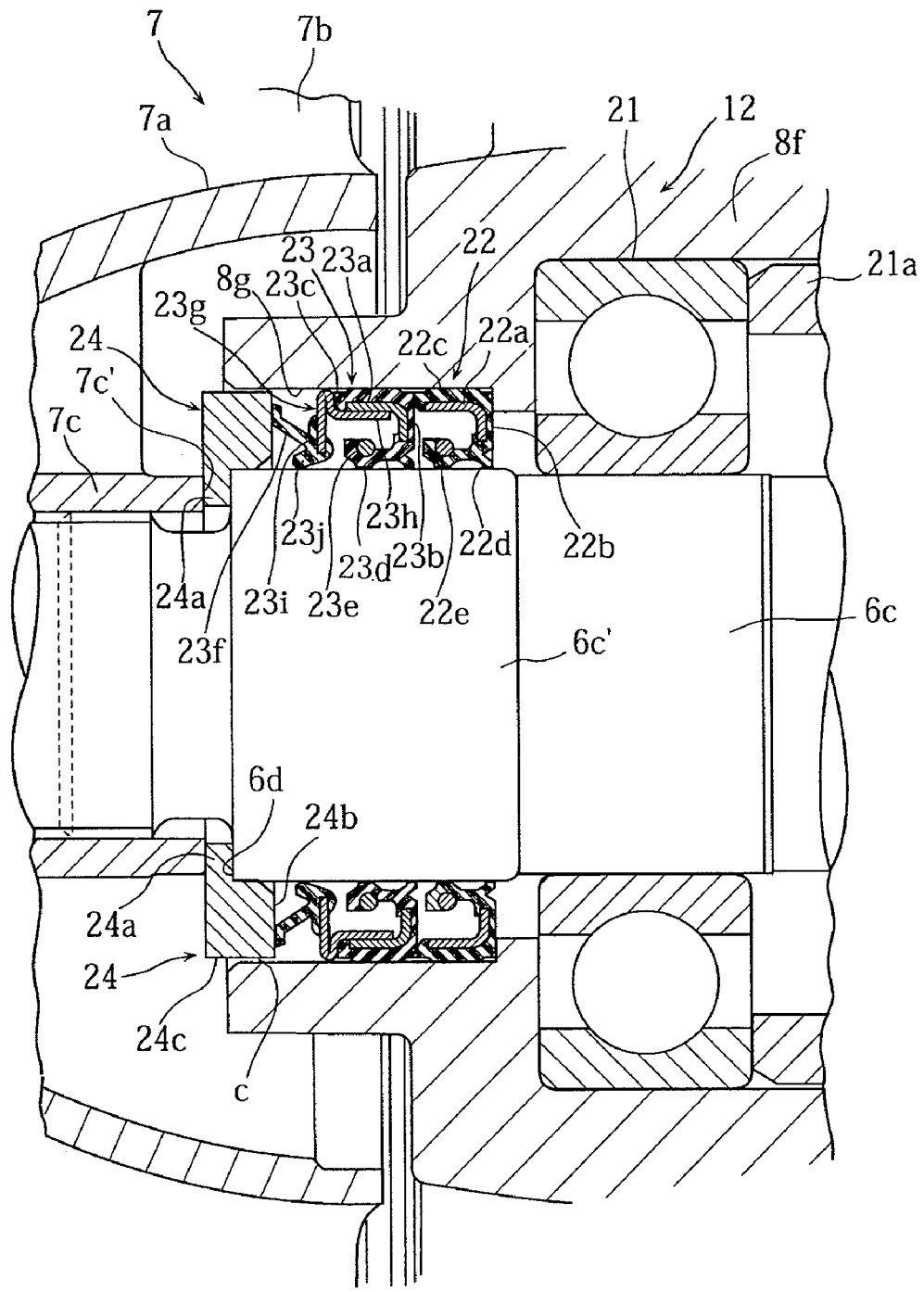
FIG. 5 is another enlarged sectional side view, illustrating a rear part of the sealing device.

With continued reference to FIG. 5, the rear bearing device 12 can include a first and a second rear bearings 21, 21 placed between a bearing boss 8f of the bearing housing 8e and the support section 6c of the drive shaft body 6b. An area forward of the first rear bearing 21 can be sealed by a fourth oil seal 22 and a fifth oil seal 23, located forward relative to the first rear bearing 21 and by a rear contact member 24 located forward relative to the fifth oil seal 23. Reference numeral 21a identifies a collar for restricting an axial gap between the first and the second rear bearings 21, 21. The bearing housing 8e and the bearing boss 8f can both be formed into a cylindrical shape, and connected to each other through plural stator blades 8i arranged radially. A water flow pressurized by the impeller 7 can be regulated by the stator blades 8i.

The fourth oil seal 22 can have a retainer ring 22a formed by pressing a metal plate into an overall ring shape with an U-shape in section, and a sealing body 22b located to cover the retainer ring 22a and fixed thereto by means of baking or the like. The fourth oil seal 22 can be fixed to the bearing boss 8f by press-fitting an outer peripheral portion 22c of the sealing body 22b into the sealing hole 8g formed in a front edge of the bearing boss 8f.

A radially-working lip 22d can be formed as a radially sealing section on an inner peripheral edge of the sealing body 22b. The radially-working lip 22d contacts a sealing section 6c' of the drive shaft body 6b in the radial direction. A spring ring 22e can be disposed in the radially-working lip 22d. The spring ring 22e urges the radially-working lip 22d in a direction such that the lip 22d can be compressed radially, thereby improving sealability between the radially-working lip 22d and the sealing section 6c' in the radial direction.

The fifth oil seal 23 can have a retainer ring 23a and a sealing body 23b, which respectively have shapes in common with the retainer ring 22a and the sealing body 22b of the fourth oil seal 22. An outer peripheral portion 23c of the sealing body 23b can be press-fitted into the sealing hole 8g. Similar to the above case, a radially-working lip 23d can be formed on an inner peripheral edge of the sealing body 23b. A spring ring 23e can be disposed in the radially-working lip 23d.

A lip retainer ring 23g can be fitted into and connected to the retainer ring 23a of the firth oil seal 23. An axially-working lip 23f, which forms an axially sealing section, can be fixed to the lip retainer ring 23g. The axially-working lip 23f extends radially outward and obliquely to the front. The lip retainer ring 23g can be formed by pressing a metal plate into an overall ring shape with an L-shape in section. A horizontal side 23h of the lip retainer ring 23g can be fitted to an inner surface of the retainer ring 23a. A base portion 23j of the axially-working lip 23f can be fixed to a vertical side 23i of the lip retainer ring 23g.

The rear contact member 24 can be a ring member made of metal (stainless in this embodiment) and has an integrally-formed retainer flange 24a on its inner peripheral surface. Screwing the axial boss portion 7c of the impeller 7 to the drive shaft body 6b allows the retainer flange 24a to be supported between a rear end surface 7c' of the axial boss portion 7c and a front end surface of the sealing section 6c' of the drive shaft body 6b.

The axially-working lip 23f contacts a rear end surface 24b of the rear contact member 24. A part of an outer peripheral surface 24c of the rear contact member 24 can be inserted in the sealing hole 8g of the bearing boss 8f. There can be a slight gap (c) between the inserted part of the outer peripheral surface 24c and the sealing hole 8g.

To assemble the water jet pump 4, the first and the second rear bearings 21, 21 and the collar 21a can be set onto the support section 6c of the drive shaft body 6b from the back and fixed thereto with a nut 21b, and then the support section 6c can be press-fitted into the support hole 8h of the bearing boss 8f. Then, the fourth oil seal 22 and the fifth oil seal 23 can be press-fitted from the front end side of the drive shaft body 6b into a space between the sealing hole 8g of the bearing boss 8f and the sealing section 6c', and the rear contact member 24 can be attached to the fourth oil seal 22 and the fifth oil seal 23. Further, the impeller 7 can be screwed to the drive shaft body 6b to fixedly support the rear contact member 24 between the axial boss portion 7c of the impeller 7 and the sealing section 6c' of the drive shaft body 6b, as mentioned previously. The front end of the drive shaft body 6b can be inserted into the sleeve 6a to connect the impeller housing 8d and the bearing housing 8e to the rear end of the water passage 8.

In some embodiments, the sealing members for the front bearing device 11 include the third oil seal 18 and the front contact member 19. The third oil seal 18 includes the radially-working lip 18d for radial sealing and the axially-working lip 18f for axial sealing. The front contact member 19 can be designed to contact the axially-working lip 18f. This improves sealability for water pressure acting in the axial direction in addition to the sealability in the radial direction, and therefore prevents water from entering the front bearing 15 even if the water pressure increases in the axial direction with an increase in engine speed.

Because the front contact member 19 can be covered with the cover 20 having the anti galvanic corrosion lip 20a, the front housing 14 can be prevented from galvanic corrosion caused due to the front contact member 19 made of stainless steel and the front housing 14 made of aluminum alloy. The cover 20 designed to cover the front contact member 19 suppresses corrosion due to seawater.

Further, the anti galvanic corrosion lip 20a can provide a pumping function. For example, the anti galvanic corrosion lip 20a can be configured to cause water to scatter outwardly by generating a centrifugal force produced when the anti galvanic corrosion lip 20a rotates with the drive shaft body 6b. Even if the front contact member 19 is exposed to water, the centrifugal force causes the water to scatter. This aids in preventing water from entering the front bearing 15.

The sealing members for the rear bearing device 12 can include the fifth oil seal 23 and the rear contact member 24. The fifth oil seal 23 can include the radially-working lip 23d for radial sealing and the axially-working lip 23f for axial sealing. The rear contact member 24 can be designed to contact the axially-working lip 23f. This improves sealability against water pressure acting in the axial direction in addition to the sealability in the radial direction, and thus can help prevent water from entering the rear bearing 21, as in the case with the front bearing device 11.

A part of the rear contact member 24 can face the sealing hole 8g of the bearing boss 8f with a slight gap (c). Thus, the centrifugal force, produced when the rear contact member 24 rotates with the drive shaft 6, can aid in discharging the water to an external location, and aid in preventing water from entering the rear bearing 21.

The front bearing device 11 and the rear bearing device 12 can have their respective axially-working lips 18f and 23f tilted outward in the radial direction. This improves water pressure resistance performance of these lips 18f and 23f, and therefore aids in preventing of the entry of water when an increase in water pressure is subjected to the lips 18f and 23f. In other words, with the axially-working lips 18f and 23f being tilted outwardly and contacting the corresponding contact members, the lips 18f and 23f generate sufficient additional resistance against the entry of water to withstand larger water pressures in case water enters from the outer peripheral side of the contact members.

The direction of a centrifugal force, produced by rotations of the front contact member 19 and the rear contact member 24, corresponds with the tilt direction of the axially-working lips 18f and 23f. Thus, less force is applied to the lips 18f and 23f, which improves service life thereof.

The front bearing device 11 can have the radially-working lip 18d and the axially-working lip 18f are formed as a single monolithic part. The rear bearing device 12 has the radially-working lip 23d and the axially-working lip 23f that are formed into one via the lip retainer ring 23g. This enables a reduction in the number of parts and the number of assembly steps, as well as space savings.

In some embodiments, the water jet pump 4 can be provided as the propulsion unit, the water jet pump 4 having the impeller 7 driven by the drive shaft 6, the water passage 8 through which water drawn by rotations of the impeller 7 passes, and the jet nozzle 9 for jetting water pressurized by the impeller 7. In this case, the front contact member 19 and the rear contact member 24 can be provided to face a space communicating with the water passage 8. The front contact member 19 and the rear contact member 24 withstand water pressure in the space, and aid in preventing water from entering the front bearing 15 and the rear bearing 21.

Figure 6:
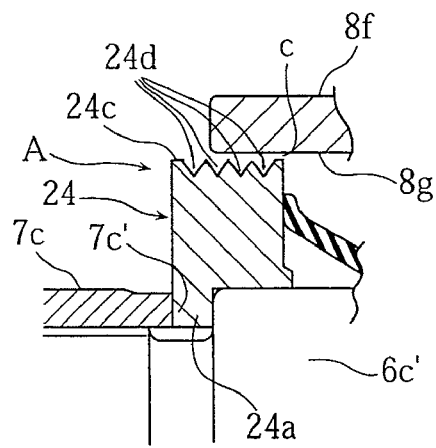
FIG. 6 is a sectional side view, illustrating an optional rear contact member of the rear part of the sealing device.
Figure 7:
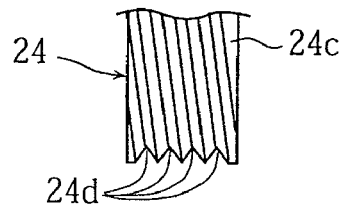
FIG. 7 is a top plan view, illustrating the rear contact member of FIG. 6.
Figure 8:
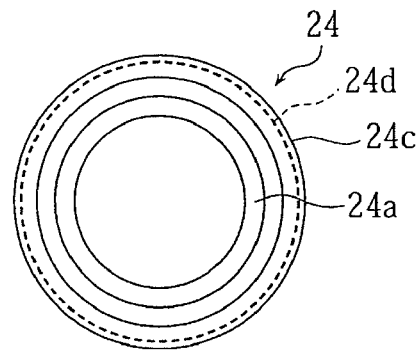
FIG. 8 is a rear view, illustrating the rear contact member of FIG. 6.

FIGS. 6 to 8 illustrate another embodiment of the shaft seal arrangement of FIGS. 1-5. In this modification, the rear contact member 24 can be configured such that a part of the outer peripheral surface 24c can be inserted in the sealing hole 8g of the bearing boss 8f to be opposed to the sealing hole 8g with the slight gap (c). As shown in FIG. 5, this structure can otherwise be the same as the structure described above with reference to FIGS. 1-5.

With regard to the embodiment of FIGS. 6 to 8, a water discharging structure A can be provided on the outer peripheral surface 24c of the rear contact member 24. The water discharging structure A can be designed to guide water externally of the bearing boss 8f in the axial direction (forward) when the rear contact member 24 rotates. The water discharging structure A can be defined by a helical groove 24d on the outer peripheral surface 24c. Alternatively, the water discharging structure A may be defined by forming a projecting helical rib or forming both the aforementioned groove and the rib. However, other configurations can also be used.

In some embodiments, the water discharging structure A formed by the helical groove 24d can be provided on the outer peripheral surface 24c of the rear contact member 24. Such a structure allows water, which can enter from a gap between the rear contact member 24 and the sealing hole 8g of the bearing boss 8f toward the rear bearing 21, to be discharged externally in the axial direction, and further aids in preventing water from entering the rear bearing 21.

Figure 9:
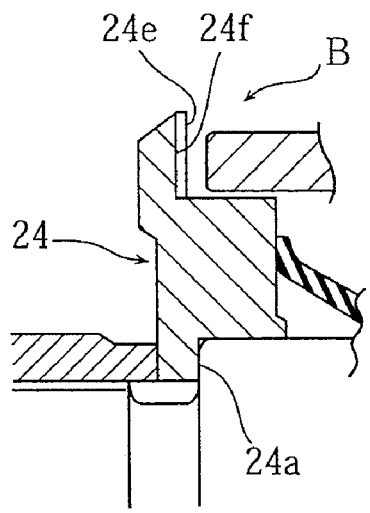
FIG. 9 is a sectional side view, illustrating another optional rear contact member of the rear part of the sealing device.
Figure 10:
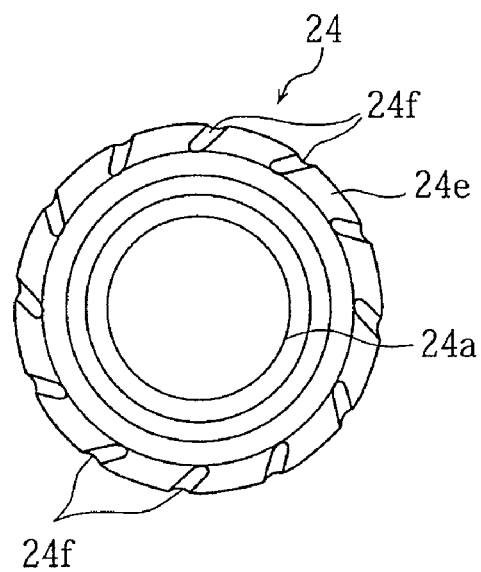
FIG. 10 is a rear view, illustrating the rear contact member of FIG. 9.

FIGS. 9 and 10 illustrate another embodiment of the shaft seals of FIGS. 1-8. In some embodiments, a water scattering structure B can be provided on an axial end surface 24e of the rear contact member 24. The water scattering structure B can be designed to guide water externally in the radial direction when the rear contact member 24 rotates. The water scattering structure B can be formed with multiple grooves 24f extending in a radial or helical manner from an outer peripheral edge of the axial end surface 24e of the rear contact member 24 toward an axial center portion thereof. Alternatively, the water scattering structure B may be defined by forming a projecting helical rib or forming both the aforementioned groove and the rib. However, other configurations can also be used.

In some embodiments, the helical grooves 24f can be provided on the axial end surface 24e of the rear contact member 24. Such a structure allows water moving toward the bearing 21 to scatter externally in the radial direction, and therefore further aids in prevention of water from entering the bearing 21. In some embodiments, the water discharging structure A can be used in combination with the water scattering structure B.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combination or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

What is claimed is:

1. A drive shaft sealing device for a small watercraft comprising a drive shaft configured to transmit engine power to a propulsion unit, a bearing rotatably supporting the drive shaft, a housing holding the bearing, and a sealing member interposed between the housing and the drive shaft and configured to prevent water from entering the bearing, the sealing member comprising a radially sealing section which contacts the drive shaft in a radial direction to seal a gap between the drive shaft and the housing in the radial direction, an axially sealing section extending in an axial direction, and a contact member which contacts the axially sealing section to seal the gap between the drive shaft and the housing in the axial direction, the contact member being connected to the drive shaft to rotate with the drive shaft, wherein the axially sealing section includes a lip extending generally in the axial direction, the lip also being tilted outwardly in the radial direction.

2. The drive shaft sealing device for a small watercraft according to claim 1, wherein the radially sealing section and the axially sealing section are one monolithic part.

3. The drive shaft sealing device for a small watercraft according to claim 1, wherein a water scattering structure is provided on an axial end surface of the contact member, the water scattering structure being designed to guide water externally in the radial direction when the contact member rotates with the drive shaft.

4. The drive shaft sealing device for a small watercraft according to claim 1, wherein the contact member is located such that at least a part of the contact member faces the housing, and the part of the contact member facing the housing is provided with a water discharging structure, the water discharging structure being designed to guide water externally of the housing in the axial direction when the contact member rotates with the drive shaft.

5. The drive shaft sealing device for a small watercraft according to claim 1, wherein the contact member is made of metal, and an insulating cover is disposed to cover at least a part of the contact member.

6. The drive shaft sealing device for a small watercraft according to claim 1, wherein the propulsion unit is a water jet pump, the water jet pump including an impeller driven by the drive shaft, a water passage through which water drawn by rotations of the impeller passes, and a jet nozzle for jetting the water pressurized by the impeller, and the contact member is provided to face a space communicating with the water passage.

7. The drive shaft sealing device for a small watercraft according to claim 1, wherein the drive shaft comprises a shaft body disposed in a drive shaft sleeve, the radially sealing section contacting an outer surface of the drive shaft sleeve.

8. The drive shaft sealing device for a small watercraft according to claim 1. in combination with a watercraft comprising a hull, wherein the drive shaft extends through an aperture in the hull.

9. A drive shaft sealing device for a small watercraft comprising a drive shaft configured to transmit engine power to a propulsion unit, a bearing rotatably supporting the drive shaft a housing holding the beam and a sealing member interposed between the housing and the drive shaft and configured to prevent water from entering the bearing, the sealing member comprising a radially sealing section which contacts the drive shaft in a radial direction to seal a between the drive shaft and the housing in the radial direction, an axially sealing section extending in an axial direction, and a contact member which contacts the axially sealing section to seal the gap between the drive shaft and the housing in the axial direction, the contact member being connected to the drive shaft to rotate with the drive shaft wherein the radially sealing section and the axially sealing section are one monolithic part.

10. A drive shaft sealing device for a small watercraft comprising a drive shaft configured to transmit engine power to a propulsion unit, a bearing rotatably supporting the drive shaft, a housing holding the bearing, and a sealing member interposed between the housing and the drive shaft and configured to prevent water from entering the bearing, the sealing member comprising a radially sealing section which contacts the drive shaft in a radial direction to seal a gap between the drive shaft and the housing in the radial direction an axially sealing section extending in an axial direction and a contact member which contacts the axially sealing section to seal the gap between the drive shaft and the housing in the axial direction, the contact member being connected to the drive shaft to rotate with the drive shaft, wherein a water scattering structure is provided on an axial end surface of the contact member, the water scattering structure being designed to guide water externally in the radial direction when the contact member rotates with the drive shaft.

11. The drive shaft sealing device for a small watercraft according to claim 10, wherein the water scattering structure is formed by at least one of a groove and a rib which extend from an outer peripheral edge of the axial end surface of the contact member toward an axial center portion thereof.

12. A drive shaft sealing device for a small watercraft comprising a drive shaft configured to transmit engine power to a propulsion unit, a bearing rotatably supporting the drive shaft, a housing holding the bearing, and a sealing member interposed between the housing and the drive shaft and configured to prevent water from entering the bearing, the sealing member comprising a radially sealing section which contacts the drive shaft in a radial direction to seal a gap between the drive shaft and the housing in the radial direction, an axially sealing section extending in an axial direction, and a contact member which contacts the axially sealing section to seal the gap between the drive shaft and the housing in the axial direction, the contact member being connected to the drive shaft to rotate with the drive shaft wherein the contact member is located such that at least a part of the contact member faces the housing, and the part of the contact member facing the housing is provided with a water discharging structure, the water discharging structure being designed to guide water externally of the housing in the axial direction when the contact member rotates with the drive shaft.

13. The drive shaft sealing device for a small watercraft according to claim 12, wherein the water discharging structure is formed by at least one of a groove and a rib formed in a helical manner on the part of the contact member facing the housing.

14. A shaft sealing assembly for supporting a spinning shaft, the shaft sealing assembly comprising a bearing rotatably supporting the spinning shaft, a housing supporting the bearing, and a sealing member interposed between the housing and the spinning shaft and configured to prevent water from entering the bearing, the sealing member comprising a generally radially extending sealing section which contacts the spinning shaft in a generally radial direction to seal a gap between the spinning shaft and the housing in the generally radial direction, a generally axially extending sealing section extending in a generally axial direction, and a contact member which contacts the generally axially extending sealing section to seal the gap between the spinning shaft and the housing in the generally axial direction, the contact member being connected to the spinning shaft to rotate with the spinning shaft wherein the axially sealing section includes a lip extending generally in the generally axial direction, the lip also being tilted outwardly in the generally radial direction.

15. The shaft sealing assembly according to claim 14, wherein the spinning shaft comprises a shaft body disposed in a shaft sleeve, the generally radially extending sealing section contacting an outer surface of the shaft sleeve.

* * * * *

UNITED STATES PATENT AND TRADEMARK OFFICE
CERTIFICATE OF CORRECTION

PATENT NO.       : 7,530,870 B2                                    Page 1 of 1
APPLICATION NO.  : 11/864493
DATED            : May 12, 2009
INVENTOR(S)      : Kishimoto et al.

It is certified that error appears in the above-identified patent and that said Letters Patent is hereby corrected as shown below:

In Column 9, Line 19, in Claim 2, after "are" insert --formed into--.

In Column 9, Line 49, in Claim 8, change "1." to --1,--.

In Column 9, Line 54, in Claim 9, change "shaft" to --shaft,--.

In Column 9, Line 55, in Claim 9, change "beam" to --bearing--.

In Column 9, Line 58, in Claim 9, change "a between" to --a gap between--.

In Column 9, Line 64, in Claim 9, change "shaft" to --shaft,--.

In Column 9, Line 65, in Claim 9, after "are" insert --formed into--.

In Column 10, Line 7, in Claim 10, change "direction" to --direction,--.

In Column 10, Line 8, in Claim 10, change "direction" to --direction,--.

In Column 10, Line 33, in Claim 12, change "shaft" to --shaft,--.

In Column 10, Line 59, in Claim 14, change "shaft" to --shaft,--.

Signed and Sealed this

Twenty-seventh Day of April, 2010

David J. Kappos
*Director of the United States Patent and Trademark Office*